United States Patent
Tsai et al.

(10) Patent No.: US 6,917,171 B2
(45) Date of Patent: Jul. 12, 2005

(54) CONTROL DEVICE AND METHOD OF STOPPING SPINDLE MOTOR OF AN OPTICAL DISC SYSTEM

(75) Inventors: Tsai-Hsin Tsai, Hsin-Tien (TW); Umi Huang, Hsin-Tien (TW); Yu-I Chen, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 0 days.

(21) Appl. No.: 10/664,644

(22) Filed: Sep. 17, 2003

(65) Prior Publication Data

US 2004/0100215 A1 May 27, 2004

(30) Foreign Application Priority Data

Nov. 21, 2002 (TW) ........................................ 91133922 A

(51) Int. Cl.[7] ................................................. H02P 3/20
(52) U.S. Cl. ....................... 318/369; 318/297; 318/362; 318/300; 388/932
(58) Field of Search .......................... 318/54, 369, 376, 318/366, 362, 300, 297; 388/932

(56) References Cited

U.S. PATENT DOCUMENTS

| | | | | |
|---|---|---|---|---|
| 4,039,919 A | * | 8/1977 | Suzaki et al. ................ | 318/696 |
| 4,779,260 A | * | 10/1988 | Kaneko et al. ............. | 369/266 |
| 4,822,331 A | * | 4/1989 | Taylor .......................... | 494/16 |
| 4,928,044 A | * | 5/1990 | Shiba .......................... | 318/364 |
| 5,038,065 A | * | 8/1991 | Matsubayashi et al. ...... | 310/162 |
| 5,070,285 A | * | 12/1991 | Yamane et al. ............. | 318/461 |
| 5,220,257 A | * | 6/1993 | Yoshino et al. ............. | 318/254 |
| 5,463,293 A | * | 10/1995 | Matsui ......................... | 318/285 |
| 5,592,446 A | * | 1/1997 | Saitoh et al. ............. | 369/44.27 |
| 5,734,241 A | * | 3/1998 | Okada et al. ................ | 318/366 |
| 5,874,817 A | * | 2/1999 | Yashita et al. ............... | 318/439 |
| 6,104,153 A | * | 8/2000 | Codilian et al. ............. | 318/362 |
| 6,122,234 A | * | 9/2000 | Fujitani et al. ............. | 369/47.4 |
| 6,153,989 A | * | 11/2000 | Kardash et al. ............. | 318/254 |
| 6,198,590 B1 | * | 3/2001 | Codilian et al. .......... | 360/73.03 |
| 6,333,903 B1 | * | 12/2001 | Suzuki ....................... | 369/47.4 |
| 6,552,988 B1 | * | 4/2003 | Nishiwaki et al. ........ | 369/59.22 |
| 6,754,151 B2 | * | 6/2004 | Watt ......................... | 369/47.36 |

\* cited by examiner

Primary Examiner—Rita Leykin
(74) Attorney, Agent, or Firm—J.C. Patents

(57) ABSTRACT

A control device and a method of stopping the spindle motor or an optical disc system. The control device primarily includes an optical disc control chip, a motor driving circuit and a spindle motor. The optical disc control chip generates and delivers a spindle motor control signal to the motor driving circuit for driving the spindle motor into rotation. During a first period, the spindle motor control signal level is controlled to produce the largest reversing torque permitted by the spindle motor for braking purpose. During a second period, the spindle motor control signal level decreases gradually to approach to a lock level that is smaller than that for actuating the spindle motor, so that the reversing torque is also decreasing gradually. During a third period, the spindle motor control signal at a level between the lock level and a motor stoppage level indicative of the spindle motor remaining stationary is applied to the motor driving circuit so that a locking torque which has the same rotation direction with that for read-/write-operations is derived in the spindle motor. The locking torque is controlled at a level less than that for actuating the spindle motor again. Finally, the spindle motor remains stationary after the third period terminates.

20 Claims, 1 Drawing Sheet

CONTROL DEVICE AND METHOD OF STOPPING SPINDLE MOTOR OF AN OPTICAL DISC SYSTEM

CROSS-REFERENCE TO RELATED APPLICATION

This application claims the priority benefit of Taiwan application serial no. 91133922, filed on Nov. 21, 2002.

BACKGROUND OF THE INVENTION

1. Field of Invention

The present invention relates to an optical disc system. More particularly, the present invention relates to a method of stopping the spindle motor of an optical disc system.

2. Description of Related Art

Multimedia storage is an important aspect in operating a multimedia system through a computer system. Technologists spend a lot of research money on multimedia storage to increase storage capacity and access reliability. Different types of multimedia storage systems all having rather high stability and storage capacity are developed. Since optical disc storage has many advantages including high stability and storage capacity, optical disc products enjoy an ever-increasing range of applications.

In general, two principle modes for operating an optical disc system are the constant linear velocity (CLV) mode and the constant angular velocity (CAV) mode. In the constant angular velocity mode of operation, when data needs to be read out from an optical disc, rotation speed of a spindle motor driving the optical disc remains constant whether the pick-up head is located on an inner section or an outer section of the optical disc. However, the circumference is considerably greater for a circle in the outer section of the optical disc than a circle on the inner section of the optical disc. Hence, a higher data transmission rate is required when the pick-up head is reading from a location close to the outer section of the optical disc compared with a location close to the inner section of the optical disc. Due to the different data transmission rate between the inner and outer sections of an optical disc operating in a constant angular velocity mode, synchronous signal obtained from a data read-out frame can no longer be used for controlling the rotation of the spindle motor. Instead, a frequency generator (FG) is used to provide a frequency signal to detect the rotation speed of the spindle motor, thereby controlling the rotation speed of the spindle motor.

To read data from an optical disc operating in the constant linear velocity mode, rotation speed of a spindle motor driving the optical disc is changed according to whether the pick-up head is located on an inner section or an outer section of the optical disc. Hence, the pick-up head is able to receive data at a constant data transmission rate no matter if the pick-up head is reading data from an inner section or an outer section of the optical disc. In other words, the spindle motor will spin faster when the optical pick-up head needs to read data from an inner section of the optical disc. Conversely, the spindle motor will spin slower when the optical pick-up head needs to access data from an outer section of the optical disc. The rotation speed of the spindle motor is controlled through the synchronous signal from a data read-out frame instead of a frequency signal provided by a frequency generator. However, to stop the rotating spindle motor in the optical disc system (for example, after pressing the eject button), FG signal can no longer be relied on for monitoring whether the spindle motor has already stopped or not.

SUMMARY OF THE INVENTION

To overcome the disadvantages of the prior art skills, the present invention provides a method and device for stopping the spindle motor of an optical disc system without referencing a frequency signal under a CLV mode.

In one embodiment, the optical disc system utilizes a spindle motor control signal transmitted to a motor driving circuit to control rotation of the spindle motor. The method includes the control at three different periods. During a first period, the level of the spindle motor control signal is controlled to generate a reversing torque in the spindle motor. During a second period, the level of the spindle motor control signal is decreasing to approach to a lock level gradually. During a third period, the spindle motor control signal with level located between the lock level and a motor stoppage level indicative of the spindle motor remaining stationary is transmitted to the motor driving circuit. Finally, a motor stoppage level indicative of the spindle motor remaining stationary is delivered to the motor driving circuit and the spindle motor stops from rotations when the third period terminates.

In the embodiment, the first period, the second period and the third period may be set according to the rotation speed of the spindle motor and the type of optical disc loaded by the spindle motor since different optical disc systems may use spindle motors having different rotation speeds, and an optical disc system may support different types of optical discs under read-/write-operations.

During the first period, the level of the spindle motor control signal can be controlled to produce the largest reversing torque permitted by the spindle motor so that the stopping is accelerated. During the second period, the level of the spindle motor signal gradually changes toward to the lock level by following a linear or a smooth curve. During the third period, the level of the spindle motor control signal is controlled at a level smaller than a threshold indicative of starting to actuate the spindle motor for data read-/write-operation so that the spindle motor effectively stops. Thus, the spindle motor is prevented from rotating again.

In the embodiment, a control device for stopping the rotation of a spindle motor includes an optical disc control chip, a motor driving circuit and a spindle motor is provided. The motor driving circuit drives the spindle motor according to the spindle motor control signal supplied by the optical disc control chip. The optical disc control chip generates a first spindle motor control signal during a first period for producing a reversing torque in the spindle motor. The optical disc control chip generates a second spindle motor control signal during a second period for driving the motor driving circuit to decrease the reversing torque level gradually. The optical disc control chip generates a third spindle motor control signal during a third period for driving the motor driving circuit to produce a locking torque in the normal rotating direction of the spindle motor. Finally, the spindle motor stops after the third period terminates since there is no torque produced by the spindle motor.

In the embodiment, the first spindle motor control signal, the second spindle motor control signal and the third spindle motor control signal are compared with a motor stoppage level to control the size and direction of the torque derived by the spindle motor. During the first period, the signal level of the first spindle motor control signal is smaller than the motor stoppage level. During the second period, signal level of the second spindle motor control signal is gradually changed towards a lock level, which indicates a threshold for effectively actuating the spindle motor to rotate for normal read-/write operations when any signal level larger than this threshold being applied to the motor driving circuit. During the third period, the third spindle motor control signal level is larger than the motor stoppage level. Finally, the spindle motor stops from rotations after the third period terminates since there is no torque produced by the spindle motor.

In brief, the aforementioned method is capable of stopping the spindle motor of an optical disc system carrying different types of discs without the need to reference a frame generator signal.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
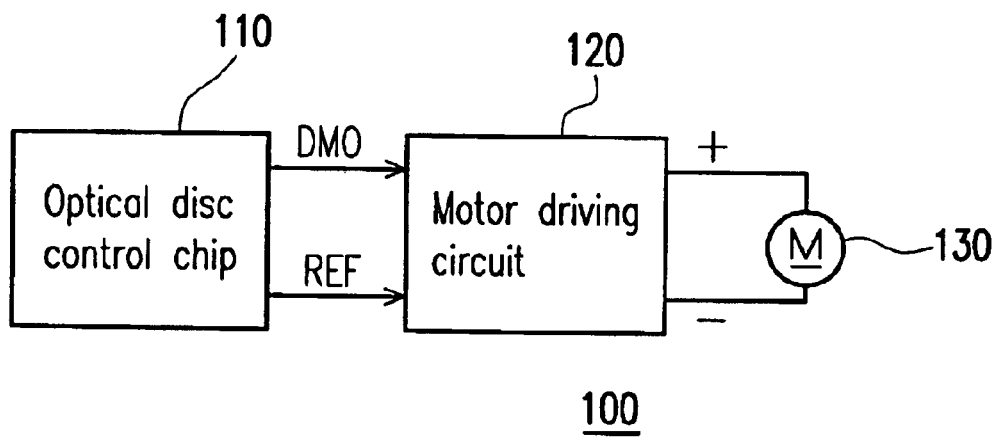
FIG. 1 is a block diagram showing the spindle motor control device of an optical disc system.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the spindle motor control circuit of an optical disc system. As shown in FIG. 1, the spindle motor control device 100 includes an optical disc control chip 110, a motor driving circuit 120 and a spindle motor 130. The spindle motor 130 in the embodiment is a D.C. motor. The spindle motor 130 rotates when driven by the motor driving circuit 120. The motor driving circuit 120 controls the rotation direction and speed of the spindle motor 130 according to the spindle motor control signal DMO and the reference signal REF transmitted from the optical disk control chip 110.

When the level of the spindle motor control signal DMO is higher than the reference signal REF level, the motor driving circuit 120 drives the spindle motor 130 to rotate in a direction for normal read-/write-operations. When the DMO signal level is smaller than the REF signal, the motor driving circuit 120 controls the spindle motor 130 to generate a reversing torque that opposes the normal rotation direction. Finally, when DMO signal level is at the same level as the REF signal, the spindle motor 130 stops from rotations since there is no signal provided to drive the spindle motor for rotations. The reference signal REF level at which the motor stops is know as the motor stoppage level.

Figure 2:
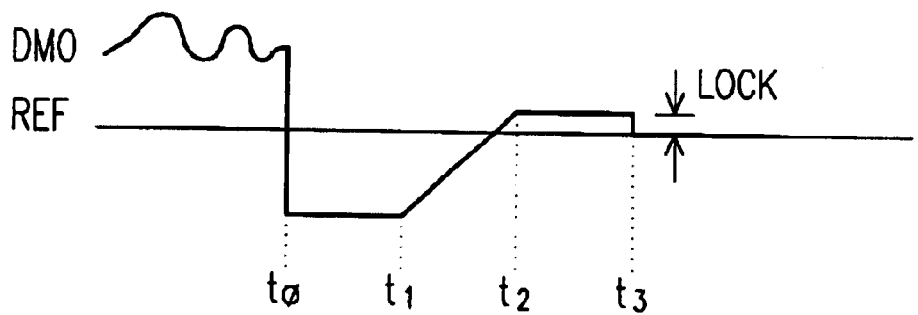
FIG. 2 is a diagram showing the timing variation of a spindle motor control signal for stopping the spindle motor of an optical disc system according to one preferred embodiment of this invention.

FIG. 2 is a diagram showing the timing variation of a spindle motor control signal for stopping the spindle motor of an optical disc system according to one preferred embodiment of this invention. As shown in FIG. 2, the spindle motor 130 rotates normally so that a pick-up head is able to read/write data from/to an optical disc before time t0. Hence, the spindle motor control signal DMO is at a level well above the reference signal REF level to maintain required forward rotation direction. Since the rotation speed when reading data from an inner section of an optical disc may differ from the rotation speed when reading data from an outer section of the optical disc, the DMO signal may contain disturbances rather than following a straight line.

At time t0, the optical disc system terminates currently processing read/write-operation and prepares to stop rotations of the spindle motor. The optical disc system transmits the DMO signal to the motor driving circuit 120 so that a reversing torque can be derived to decelerate the forward rotations of the spindle motor 130. Obviously, the DMO signal level transmitted to the motor driving circuit 120 can be a constant level as shown in FIG. 2. Please note that the DMO signal level provided to the motor driving circuit 120 may not be so smooth as shown in FIG. 2 since any reversing torque provided for braking the spindle motor 130 may be used in the embodiment. Nevertheless, a DMO signal indicative of the largest reversing torque permitted by the spindle motor 130 may be applied and delivered to the motor driving circuit 120 in order to stop the spindle motor 130 as quickly as possible.

At time t1, rotation speed of the spindle motor 130 has dropped to an easily manageable level, and the DMO signal level is decreased gradually so as to smooth out motor rotations. As known by the skilled persons, the DMO signal level may not reduce linearly as shown in FIG. 2. In fact, the signal DMO may be gradually reduced in some other way as long as the reversing torque drops slowly to make the spindle motor 130 stop mildly. Nevertheless, in order to stop the spindle motor 130 gently, the DMO signal level may be dropped linearly or smoothly following a smooth curve.

After the reversing torques being employed for braking the spindle motor 130 during the first period from t0 to t1 and the second period from t1 to t2, the current state of the spindle motor 130 may be different since the spindle motor 130 may load discs with different weights. For example, the DMO signal applied to the motor driving circuit 120 may maintain for a longer period when the spindle motor 130 loads a heavier optical disc such as a DVD-5 or DVD-9 disc. Conversely, the spindle motor 130 may be driven to rotate reversely by the reversing torque when the spindle motor loads a lighter optical disc such as an 8 cm or a name card size optical disc currently. If the disc holder is opened up at this moment, the loaded optical disc may fly out undesirably. To prevent any reverse rotation, a DMO signal at a lock level close to the motor stoppage level for deriving a locking torque with forward rotation direction in the spindle motor 130 is delivered to the motor driving circuit 120 during the third period from t2 to t3. In addition, because the spindle motor 130 may now stop rotating if a heavier optical disc such as the DVD-5 or DVD-9 is carried currently, the DMO signal level applied to the motor driving circuit 120 is preferably smaller than a threshold indicative of starting to actuate the spindle motor 130 for rotations. This prevents the spindle motor 130 from being actuated to rotate forward again after stopping.

Since the spindle motor 130 has already stopped at time t3, the spindle motor control signal DMO is set to the motor stoppage level so that the spindle motor 130 remains stationary.

In addition, in order to achieve requirements that different spindle motors may operate under different rotation speeds and an optical disc system may load discs with different weights, the signal levels and related maintained intervals of DMO signal may be varied as different applications. Thus, duration of the first period (t0 to t1), the second period (t1 to t2) and the third period (t2 to t3) must be set according to rotation speed of the spindle motor 130 and the type of optical disc (please note that the type of optical disc is known when it is loaded for read/write data) carried by the optical disc system.

In conclusion, this invention offers at least the following advantages:
1. The spindle motor stops without referring a frequency signal provided by a frequency generator under CLV mode.
2. The spindle motor can be efficiently stopped from rotations whatever types of optical disc are loaded.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for stopping the spindle motor of an optical disc system, comprising:

deriving a reversing torque in the spindle motor during a first period;

decreasing the reversing torque during a second period; and deriving a locking torque in the spindle motor during a third period, wherein the locking torque is substantially at a level smaller than that for actuating the spindle motor and the spindle motor remains stationary after the third period terminates.

2. The method of claim 1, wherein a largest reversing torque permitted by the spindle motor is derived during the first period.

3. The method of claim 1, wherein a spindle motor control signal is used to control the reversing torque and the locking torque derived in the spindle motor.

4. The method of claim 3, wherein a signal level of the spindle motor control signal approaches to a lock level during a second period, wherein the lock level is at a level substantially smaller than that for starting to actuate the spindle motor.

5. The method of claim 3, wherein the spindle motor control signal having a signal level between the lock level and a motor stoppage level indicative of the spindle motor remaining stationary is generated during a third period.

6. The method of claim 3, wherein a signal level of the spindle motor control signal decreases linearly during the second period.

7. The method of claim 3, wherein a signal level of the spindle motor control signal decreases smoothly following a curve during the second period.

8. A method for stopping a spindle motor of an optical disc system, comprising:

providing a spindle motor control signal having a signal level for deriving a reversing torque to brake the spindle motor during a first period;

decreasing the level of the spindle motor control signal to decrease the reversing torque during a second period; and providing the spindle motor control signal having a signal level smaller than a lock level to derive a locking torque during a third period, wherein the lock level is smaller than a threshold indicative of starting to actuate the spindle motor and the spindle motor stops from rotation after the third period terminates.

9. The method of claim 8, wherein a largest reversing torque permitted by the spindle motor is derived in the spindle motor during the first period.

10. The method of claim 8, wherein the signal level of the spindle motor control signal decreases to approach to the lock level during a second period.

11. The method of claim 8, wherein the spindle motor control signal is substantially at a level between the lock level and a motor stoppage level indicative of the spindle motor remaining stationary during a third period.

12. The method of claim 8, wherein the locking torque is substantially smaller than that for starting to actuate the spindle motor from rotations.

13. The method of claim 8, wherein the signal level of the spindle motor control signal decreases linearly during the second period.

14. The method of claim 8, wherein the signal level of the spindle motor control signal decreases smoothly following a curve during the second period.

15. A control device inside an optical disc system for stopping rotations of a spindle motor, comprising:

a motor driving circuit for driving the spindle motor; and an optical disc control chip for providing a first motor spindle control signal to the motor driving circuit during a first period so that a reversing torque is derived to brake the spindle motor, providing a second motor spindle control signal to the motor driving circuit during a second period so that the reversing torque is decreased gradually, providing a third motor spindle control signal to the motor driving circuit during a third period so that a locking torque having a level smaller than that for starting to actuate the spindle motor from rotation is derived in the spindle motor, wherein the spindle motor remains stationary after the third period terminates.

16. The control device of claim 15, wherein the reversing torque for braking the spindle motor in the first period is a largest reversing torque permitted by the spindle motor.

17. The control device of claim 15, wherein the lock level is smaller than a threshold for starting to actuate the spindle motor.

18. The control device of claim 15, wherein the level of the spindle motor control signal decreases to approach to a lock level indicative of starting to actuate the spindle motor during a second period.

19. The control device of claim 18, wherein the spindle motor control signal is substantially at a level between the lock level and a motor stoppage level indicative of the spindle motor remaining stationary during a third period.

20. The control device of claim 15, wherein the locking torque is substantially smaller than that for starting to actuate the spindle motor.

* * * * *